United States Patent
Cech et al.

(10) Patent No.: US 11,467,349 B2
(45) Date of Patent: Oct. 11, 2022

(54) STORAGE DEVICE FOR MOBILE PROVISION OF DATA AT A TECHNICAL INSTALLATION

(71) Applicant: PILZ GMBH & CO. KG, Ostfildern (DE)

(72) Inventors: Markus Cech, Ostfildern (DE); Dmitry Muravev, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 95 days.

(21) Appl. No.: 16/801,390

(22) Filed: Feb. 26, 2020

(65) Prior Publication Data
US 2020/0284994 A1  Sep. 10, 2020

(30) Foreign Application Priority Data
Feb. 26, 2019 (DE) .................... 10 2019 104 881.8

(51) Int. Cl.
*G02B 6/38* (2006.01)
*H01R 13/622* (2006.01)
*H01R 13/64* (2006.01)

(52) U.S. Cl.
CPC ......... *G02B 6/3825* (2013.01); *G02B 6/3893* (2013.01); *H01R 13/622* (2013.01); *H01R 13/64* (2013.01)

(58) Field of Classification Search
CPC .... H01R 12/721; H01R 31/06; H01R 13/623; H01R 13/502; H01R 13/66; H01R 13/533; H01R 13/6658; H01R 27/02
See application file for complete search history.

(56) References Cited

U.S. PATENT DOCUMENTS

| | | | |
|---|---|---|---|
| 5,788,528 A * | 8/1998 | Orr, Jr. ............... | H01R 13/6275 439/358 |
| 6,196,865 B1 * | 3/2001 | Ruffel .................... | H01R 13/56 439/470 |

(Continued)

FOREIGN PATENT DOCUMENTS

| | | |
|---|---|---|
| CA | 2 797 324 A1 | 12/2011 |
| DE | 10355790 A1 | 7/2005 |

(Continued)

OTHER PUBLICATIONS

TERZ Industrial Electronics; Kaliber-XS1—Industrial M12 USB Flash Drives; 2018; 2 pages.

(Continued)

*Primary Examiner* — Jean F Duverne
(74) *Attorney, Agent, or Firm* — Miller Johnson

(57) ABSTRACT

A storage device for mobile provision of data at a technical installation includes a first connector for mechanical connection to a complementary mating connector, a second connector adjoining the first connector, and a housing enclosing the first connector and the second connector. The second connector can releasably receive a storage medium in a receptacle and can contact power and data connections of the storage medium when the storage medium is in the receptacle. The first connector is coupled to the second connector and, as a result of the coupling, the power and data connections of the storage medium can be contacted via the first connector. The first connector is a round plug connector with a connecting element having a circular cross-section or a heavy-duty connector.

20 Claims, 6 Drawing Sheets

(56) References Cited

U.S. PATENT DOCUMENTS

| | | | | |
|---|---|---|---|---|
| 7,247,056 B2* | 7/2007 | Zauber | ............... | H01R 13/533 |
| | | | | 439/654 |
| 7,438,579 B1* | 10/2008 | Pellen | ............... | H01R 13/622 |
| | | | | 439/312 |
| 8,262,408 B1* | 9/2012 | Kelly | ............... | H01R 9/0524 |
| | | | | 439/578 |
| 9,118,158 B2* | 8/2015 | Kern | ............... | H01R 13/533 |
| 2003/0207603 A1* | 11/2003 | Potega | ............... | H01R 24/58 |
| | | | | 439/218 |
| 2007/0044088 A1 | 2/2007 | Eul | | |
| 2007/0126570 A1 | 6/2007 | Kathan et al. | | |
| 2008/0026641 A1 | 1/2008 | Zauber et al. | | |

FOREIGN PATENT DOCUMENTS

| | | |
|---|---|---|
| DE | 102005049483 A1 | 4/2007 |
| DE | 102010023602 A1 | 12/2011 |
| EP | 1 098 394 A1 | 5/2001 |
| EP | 3 067 992 A1 | 9/2016 |
| WO | WO-2008061780 A2 | 5/2008 |
| WO | WO-2016037607 A1 | 3/2016 |

OTHER PUBLICATIONS

DIN EN IEC 61076-2; Sep. 2012; 64 pages (34 pages German; 30 pages English).

IEC60352-4; Excerpt from Standard DIN EN 60352-4; Sep. 2001; 46 pages.

\* cited by examiner

STORAGE DEVICE FOR MOBILE PROVISION OF DATA AT A TECHNICAL INSTALLATION

CROSS-REFERENCE TO RELATED APPLICATIONS

This application claims priority to German Application No. 10 2019 104 881.8 filed Feb. 26, 2019. The entire disclosure of the application referenced above is incorporated by reference.

FIELD

The present disclosure relates to a computer-readable storage device and more particularly to a storage device for use at a technical installation.

BACKGROUND

In order to supply technical installations and equipment in an industrial environment with data, communication interfaces can be provided that enable data transfer to the technical installation or a connection to a network. While such communication interfaces are useful for larger systems or control devices, they are not reasonable for smaller systems where only a small amount of data needs to be exchanged or where a data exchange is only rarely carried out. Rather, this is where removable storage concepts come into play, where removable storage devices are used that can have different pre-configured data sets or that can be written to at a remote unit, such as a workstation PC, with corresponding data.

The technical installation set up for use with removable data carriers usually has an integrated receptacle for connecting a conventional data carrier (e.g. USB stick or SD card), whereby the integrated receptacle must be appropriately secured and sealed for use under the demanding environmental conditions in an industrial environment. As a result, the design and construction of these devices is often more expensive than necessary, as not all users need to exchange data via a removable storage device or use it only rarely. In addition, the hardening of the integrated receptacle makes it difficult to replace a storage medium and often requires the aid of tools.

If, on the other hand, a hardened storage device is used that has an interface that is common in the industrial environment, such as the data carrier from TERZ Industrial Electronics GmbH, which is sold under the name Industrial M12 USB memory stick, the problem arises that such an interface or a corresponding adapter must also be provided at the workstation where the storage device is to be written to. This makes it difficult to use such hardened storage devices, which are also often more expensive than, for example, industrially usable memory cards with comparable capacity.

SUMMARY

It is an object of the present disclosure to provide a storage device for mobile provision of data at a technical installation which can be realised at low cost. Further, it is an object to provide a storage device that is flexible in use. Yet further, it is an object to provide a storage device that can be used under the demanding environmental conditions of an industrial environment.

According to an aspect of the present invention, there is provided a storage device for mobile provision of data at a technical device, comprising a first connector for mechanical connection to a complementary mating connector, a second connector adjoining the first connector, and a housing enclosing the first connector and the second connector, wherein the second connector is configured to releasably receive a storage medium in a receptacle and to contact power and data connections of the storage medium when the storage medium is in the receptacle, wherein the first connector is coupled to the second connector and, as a result of the coupling, the power and data connections of the storage medium can be contacted via the first connector, and wherein the first connector is a round plug connector with a connecting element having a circular cross-section or a heavy-duty connector.

It is thus an idea of the present disclosure to configure a storage device as an adapter and to integrate it into a housing. The adapter is equipped on the one hand with a connector for connection to the installation in an industrial environment and on the other hand with a second connector for the insertion of a removable storage medium, such as a commercially available, industrial-grade micro SD card. The housing can be a hardened housing.

As a hardened memory stick, the storage device can be directly coupled to the interfaces known in the industrial environment. This has the advantage that known and proven connection techniques such as industrial round plug connectors can be used to read the storage device. An integrated interface for commercially available storage media such as a card reader is then not needed at these devices. The devices to be supplied with the data can thus be manufactured at low cost and can be set up for the demanding environmental conditions in an industrial environment in a manner known per se. In addition, known interfaces are also designed to be operated without tools, Thus, handling can also be simplified compared to conventional memory cards in integrated receptacles.

The storage device configured as an adapter can also be flexibly equipped with commercially available storage media known from PC technology. Thus, different removable media can be provided at low cost and the removable media can be easily adapted and re-written with new data. A simple PC can be used for this purpose without the need for a special interface or an appropriate adapter beyond the connections available on standard PCs. This simplifies the provision of data to a technical installation and facilitates handling by the user.

In a further refinement, the housing may have a first cylindrical section which surrounds the connecting element of the first connector in a sleeve-like manner and has a thread, in particular an M12, M8, M23 or a ⅞-inch thread, via which the housing can be screwed onto the complementary mating connector for mechanical connection of the first connector to the complementary mating connector.

The connecting element of the first connector can thus be enclosed by a cylindrical housing with a thread with which the connector can be screwed to a counterpart. The housing thus forms a part of the connecting mechanism, so that no additional elements are required. In particular, the storage device does not require a union nut, as is usually used with interface adapters that are hardened by an extension.

In a further refinement, the housing may have a second section that is rigidly coupled to the first section and surrounds the second connector in a sleeve-like manner and a third section that closes the housing on one side and is detachably arranged on the second section.

The housing can thus consist of three sections in which the first and second connectors are accommodated like sleeves. The first section encloses the connecting element and forms the connecting piece to the mating connector, the second section contains the second connector including the receptacle for the removable storage medium and the third section is configured as a cover that makes the housing sealable on one side. The sections fit together seamlessly to form a tube-like container in which the first and second connectors are housed.

In a further refinement, the second section can be screwed onto the third section.

By screwing the third section onto the second section, access to the inside of the housing can easily be achieved and without the need for tools, thus improving the handling of the storage device. In particular, a removable storage medium can be easily and conveniently removed from the storage device in this way, including cases in which the adapter is connected to a mating connector via the first connector. At the same time, screwing allows a connection to the second section, which can be sealed particularly easily, e.g. by an O-ring, so that the housing can be designed overall for a high safety category.

In a further refinement, the first, second and third sections can together form a closed housing when the first connector is screwed to the complementary mating connector, in particular with compliance to IP67.

The housing can thus completely concealing the first and second connector when the first connector is screwed to a mating connector. This allows the storage device to be attached to the technical installation even during operation. The storage device thus represents an extension of the housing of the technical installation, within which the storage medium required for the technical installation is housed. For the technical installation, an integrated connection for a removable storage medium is thus not needed.

In a further refinement, the second and/or third section may be knurled.

The knurl can be a circumferential shape deviation impressed on the surface of the first and/or second section. The knurling makes the housing more grippy, which prevents it from slipping off during assembly if the housing has to be turned to make the connection with the first connector. The handling of the storage device is thus further simplified.

In a further refinement, the first and second connectors may be immobile relative to each other and together as a unit may be mounted in the housing so as to be rotatable relative to the housing.

The first and the second connector may each have terminals that face outwards to contact corresponding mating terminals. In addition, the first and second connectors have internal connections that are coupled together so that the first and second connectors form a rigid unit. For this purpose, the inner contacts of the first and second connector can be soldered, for example. As a unit, the first and second connectors are integrated into the housing, and the housing can be rotated around this unit to act as part of the connector of the first connector. This refinement allows the storage device to be very small.

In a further refinement, the second connector can be arranged inside the housing on a printed circuit board on which the power and data connections are led out as conductor tracks, and the first connector can be coupled to the second connector via the printed circuit board.

As the second connector is arranged on a printed circuit board, a commercially available connector can be used, so that it can be implemented at a particularly low cost. In addition, the printed circuit board allows other electronic components to be provided in addition to the connectors, which can perform conversion or protection tasks, for example.

In a further refinement, the device can have a printed circuit board (PCB) holder that holds the PCB in a defined position relative to the housing and is rotatably mounted in the housing. With the PCB holder it is possible to arrange a cuboid PCB in an essentially cylindrical housing. The PCB holder also enables a connector with a rectangular cross-section to be stably stored in a round housing.

In a further refinement, the connection element has a standardized mating face, in particular according to IEC61076-2 and/or IEC60352-4.

The storage device can thus be directly suitable for connection to devices with standardized interfaces.

In a further refinement, the second connector is a memory card holder in which memory cards, especially (micro) SD cards, can be used as the storage medium.

Memory card holders are used in a wide variety of electronic devices to attach removable storage media to them. Memory cards are therefore the de facto standard for memory provision in the PC and consumer electronics sector. With an adapter according to this disclosure, correspondingly inexpensive memory cards can also be used for industrial installations. At the same time, memory card readers are already available in many commercially available PCs or laptops or can be retrofitted at a lower cost than comparable interfaces from the industrial sector.

In a further refinement, the round plug connector can have five or more pins, in particular it can be an eight-pin connector.

A five-pin or multi-pin connector has the advantage that a storage medium can be addressed via several data lines and a reading speed can be increased. For example, a micro SD card can be operated in a high-speed mode through the additional connections.

In a further refinement, the first connector may define a mating direction in which the first connector is plugged onto the complementary mating connector, and the housing may extend in a tubular manner in a longitudinal direction determined by the mating direction and have a diameter in cross-section of less than or equal to 21.5 mm.

The storage device can thus be the same size as an ordinary round plug connector used, for example, for connecting cables. The connections to the technical installation can thus be arranged with known packing density. In addition, an adapter height can be at the level of standard round plug connectors when plugged in.

It is understood that the features mentioned above and those to be explained below can be used not only in the combination indicated in each case, but also in other combinations or in a stand-alone situation, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
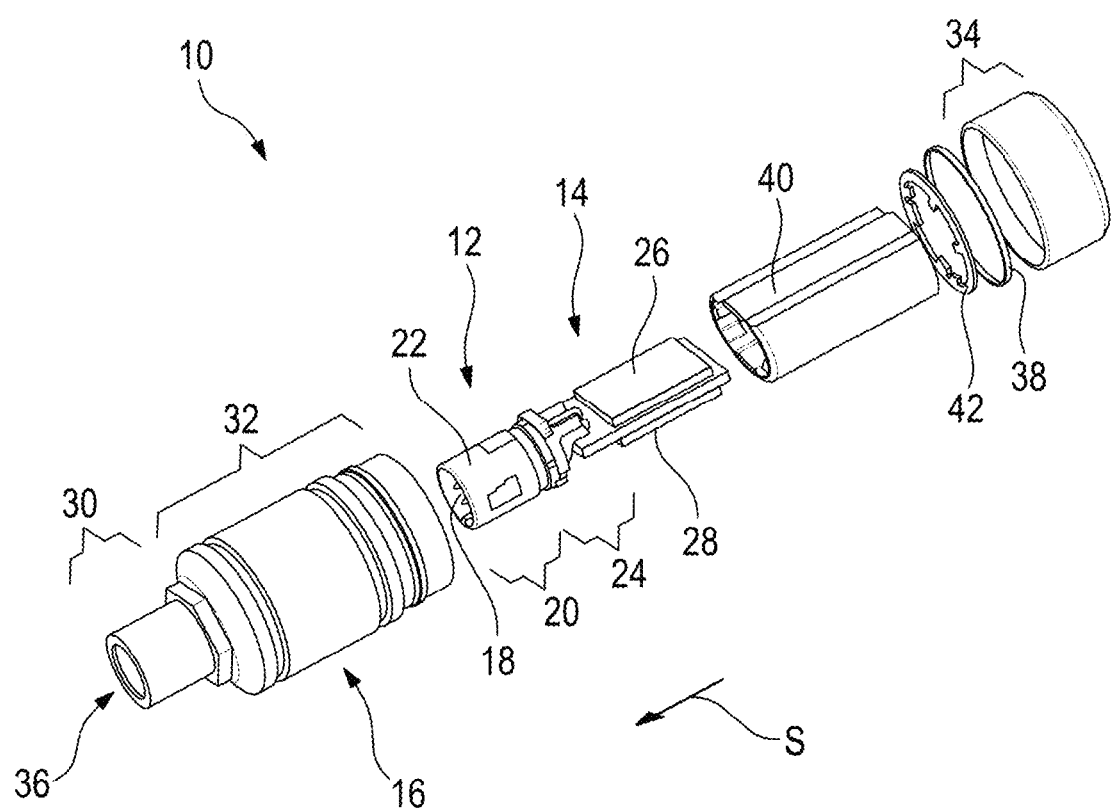
FIG. 1 is an exploded view of an exemplary embodiment of the storage device.

FIG. 1 shows an exemplary embodiment of the storage device in an exploded view. The storage device is denoted in FIG. 1 in its entirety with reference numeral 10.

The storage device comprises a first and a second connector, which are coupled to form a unit, and a housing 16 in which the unit is integrated.

The first connector 12 is an interface to a technical installation (not shown here) and can be coupled with a complementary mating connector located at the technical installation.

The second connector 14 includes an interface to a storage medium that can be detachably connected to the second connector. The second connector is configured to contact power and data connections of the storage medium.

The coupling between the first connector 12 and the second connector 14 is configured so that contacts 18 of the first connector 12 can contact the power and data connections of the storage medium coupled to the second connector. The unit comprising the first connector and the second connector 12, 14 is thus an adapter that can convert power and data connections of a storage medium to an industrially standardized connector.

The first connector can be a round plug connector as shown here with a connecting element 20 that has a circular cross-section. Alternatively, the first connector 12 can also be a proprietary heavy-duty connector that implements a specific plug connection for a technical installation. Such a heavy-duty connector (HDC) is regularly characterized by a hardened housing and an application-specific configuration.

In the exemplary embodiment shown here, the connecting element 20 of the round connector is a male plug with a hollow cylindrical sheathing 22 and contained therein freestanding contacts 18 pointing in a plug-in direction S. The contacts 18 establish an electrical connection to a complementary mating connector via corresponding sockets on the mating connector.

A cross-section through the connecting element 20 and the contacts 18 define a so-called mating face of the round plug connector. In the industrial sector, various mating faces are known and standardized according to the relevant standards such as IEC61076-2-100 for M12 round plug connectors. In addition to the contacts 18 and the diameter of the sheathing 22, other structures can be enclosed in the sheathing 22, which further define the mating face. These further structures are used in particular for a coding that specifies how to insert the connector in a defined manner to prevent incorrect insertion. The first connector 12 can be a connector standardized and coded in accordance with these provisions.

A contact element 24 is connected to the connecting element 20 of the first connector 12, via which a connection to the second connector 14 is established. The contact element 24 can extend the contacts 18 from the connecting element 20 and connect them with contacts of the second connector 14. In addition, the contact element 24 may have means by which the second connector 14 is held rigidly to the first connector 12.

The second connector 14 has a receptacle 26 in which a storage medium can be detachably received. The receptacle 26 thus represents an interface to a storage medium, via which power and data connections of the storage medium can be contacted.

The receptacle 26 can be, for example, a card reader into which memory cards can be inserted. The coupling between the first connector 12 and the second connector configured in manner that a memory card inserted in the card reader 26 can be contacted via the contacts 18 in the first connector 12. The receptacle 26 of the second connector 14 can be integrated on a printed circuit board 28 for this purpose. The printed circuit board 28 in turn can be attached to the contact element 24, so that the contacts 18 led out via the contact element 24 connect to conductor tracks on the printed circuit board 28 to connect the contacts 18 of the first connector 12 with the power and data connections of the storage medium led out via the conductor tracks.

In another exemplary embodiment, the receptacle 26 can also be a communication interface, such as a USB interface into which a storage medium can be plugged in. This interface can also be integrated on a printed circuit board in a known manner. In addition, the circuit board 28 can also contain electronic components which, for example, implement a corresponding protocol for the communication interface.

The housing 16, which houses the first and second connectors 12, 14, can have several sections. In particular, a section of housing 16 may be configured in a manner that it is part of the connection that can be made with the first connector 12. In other words, the first connector 12 and parts of the housing 16 together define the connection technique.

For example, the housing 16 may have a first section 30 that encloses the connecting element 20 in the assembled state and that cooperates with the mating connector to establish or secure the connection between the first connector 12 and the mating connector. A thread may be provided on a surface of the first section 30 for this purpose, which interacts with a mating thread on the complementary mating connector to secure the housing 16 to the complementary mating connector. It goes without saying that the connection is not limited to a screw connection, but other means of connection may also be provided on the connector or the relevant part of the housing. For example, in a different embodiment, latching means that interact with corresponding recesses on the complementary mating connector can also be arranged on the housing part.

A further section can be connected to the first section 30 of the housing 16, in which essentially the second connector 14 and a storage medium inserted into it are arranged. This second section 32 can follow immediately after the first section 30 and be rigidly connected to it. The second section 32 thus corresponds to the core of the case 16 and forms the actual container in which the components of the storage device are housed.

Finally, the second section 32 may be followed by a third section 34 that seals the housing 16 on one side. The third section 34 thus corresponds to a cover that can be detachably applied to the second section 32 to close the housing 16.

When assembled, the three sections 30, 32, 34 form a closed container in which the first and second connectors are completely enclosed and that has an opening 36 only in the area of the connecting element 20, so that the first connector 12 can interact with a mating connector. Via the opening 36, the connecting element 20 of the first connector 12 can thus be connected to a corresponding complementary mating connector, wherein the connection is configured in a manner that the housing 16 is completely closed and sealed when connected. Thereby, neither dust nor water can penetrate into the inside of the housing 16. Thus, when assembled, the housing 16 complies with at least IP67.

The third section 34 is detachable from the second section 32. Thus, the housing 16 can be opened on a side opposite the opening 36 to allow physical access to the storage medium in the receptacle 26. The third section 34 may be a cover that is screwed onto the second section and through which the storage medium inserted in the receptacle 26 is accessible and through which the storage medium can be taken out of the housing 16. The cover can thus be used to open the housing 16 to exchange the storage medium, while the first connector 12 may still be plugged in. As shown in FIG. 1, a seal may be integrated or insertable into the cover-like section 34 to seal the housing 16. The seal can be an O-ring 38. An O-ring 38 provides a particularly simple and at the same time reliable seal of the housing 16 against dust and water.

If the storage device has a printed circuit board (PCB) 28 for coupling the first and second connectors 12, 14, a printed circuit board holder 40 may also be provided. The PCB 28 can be attached to the PCB holder 40, so that it can move within the housing 16. For movable mounting, the PCB holder 40 can have one or more retaining rings 42 with a diameter corresponding to the inner diameter of the housing 16 at one or more locations. The PCB holder 40 can be held in the housing 16 via the retaining ring(s) 42. Thereby, it can only rotate around its own longitudinal axis. Instead of retaining rings, however, the PCB holder 40 can also have a body that is custom-fitted to the housing 16 for insertion.

Figure 2:
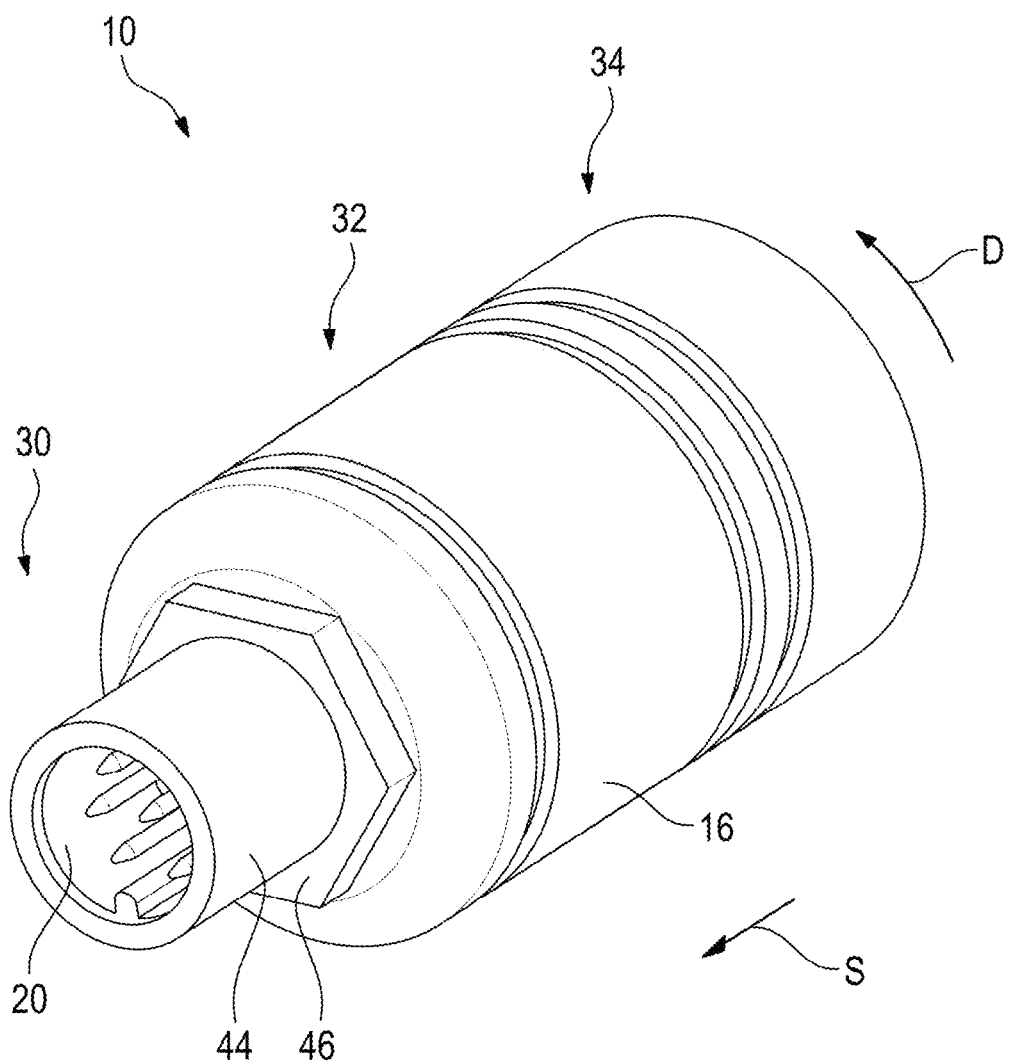
FIG. 2 is a schematic view of the exemplary embodiment of the storage device according to FIG. 1 in an assembled state with closed housing.

FIG. 2 shows the exemplary embodiment of the storage device according to FIG. 1 in an assembled state with closed housing 16.

In the assembled state, the housing 16 completely encloses the first and second connectors 12, 14, for example in a manner in which the housing 16, when the first connector 12 is connected to a mating connector, complies with IP67. The sections 30, 32, 34 of the housing 16 shown individually in FIG. 1 are thus directly connected to each other and form a closed container. The container may be part of the connection made by the first connector or at least support the connection when a connection is made between the first connector 12 and the complementary mating connector.

A thread 44 may be provided on the outer surface of the first section 30, by means of which the housing 16 can be attached and secured to a corresponding counter thread. The cylinder-like housing 16 can be turned in direction of rotation D so that the thread 44 together with the housing 16 and connecting element 20 is drawn onto the complementary mating connector in direction of insertion S. The housing 16 can thus be rotated relative to the rotatably mounted first connector 12 and second connector 14.

In order to facilitate the assembly, the housing 16 can be supported by a fourth housing section 46, which directly adjoins the first section 30 and has a hexagonal cross-section so that it can be attached to it with a corresponding wrench.

Figure 3:
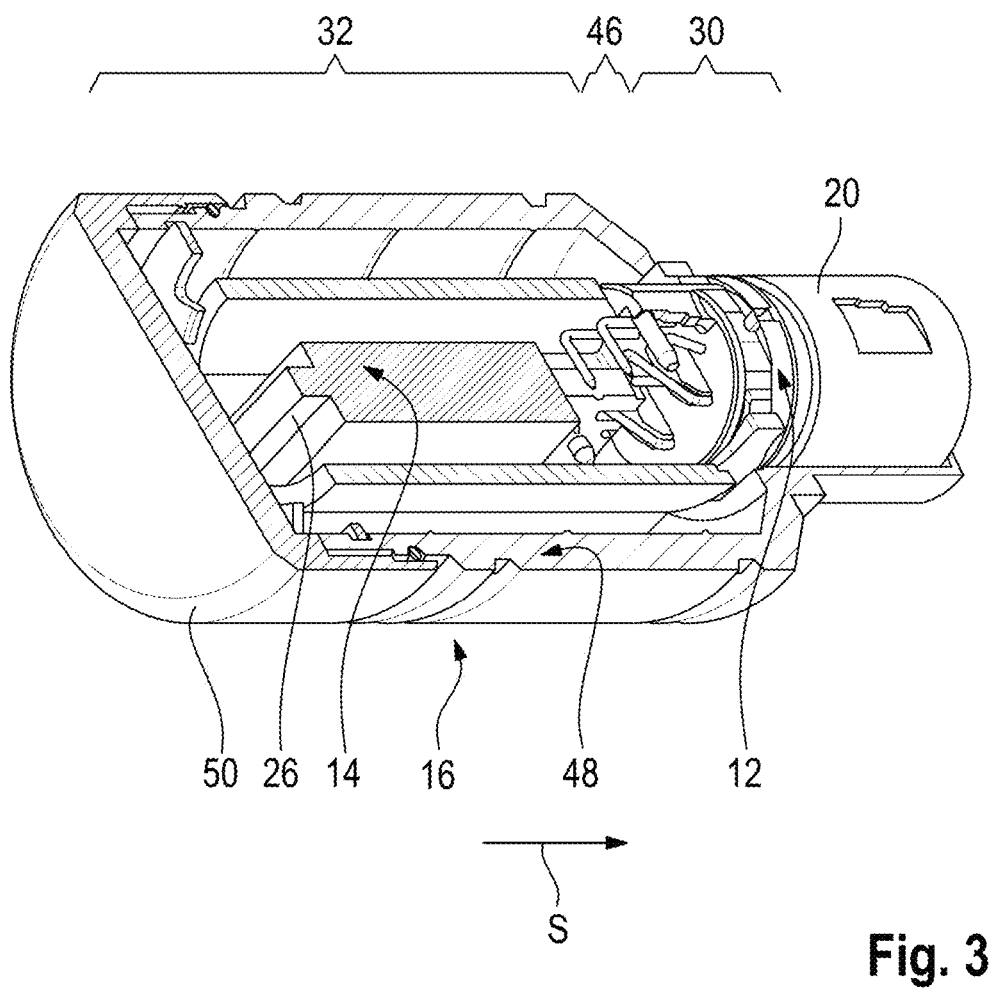
FIG. 3 is a cross-sectional view of the closed housing of the exemplary embodiment according to FIG. 2.

FIG. 3 shows the previous exemplary embodiment according to FIG. 2 in a cross-sectional view.

The housing 16 can be assembled from individual housing parts, as shown here. The housing may be assembled from a first part 48 and a second part 50.

The first part 48 is tubular and may be shaped to form the first section, the second section and the fourth section of the housing 16 as described above. The second part 50 forms the cover-like third section 34 and closes the assembled housing 16 on one side. The tubular first part 48 is thus closed on one side by the connecting element 20 and on the other side by the second part 50, which is plugged or screwed as a cover onto the first part 48. The second part 50 is detachable from the first part 48 and can be removed to make the internal second connector 14 accessible.

The second connector 14 can be integrated into the housing 16 behind the second part 50 in a manner that a storage medium, such as a memory card, can be removed from the receptacle 26 against the plug-in direction S. The unit consisting of first connector 12 and the second connector 14 can extend in plug direction S, so that a cross-section of housing 16 can be kept as small as possible. In an embodiment, the diameter can be less than or equal to 21.5 mm and thus no larger than a cable connector plugged into an M12 connection.

Figure 4:
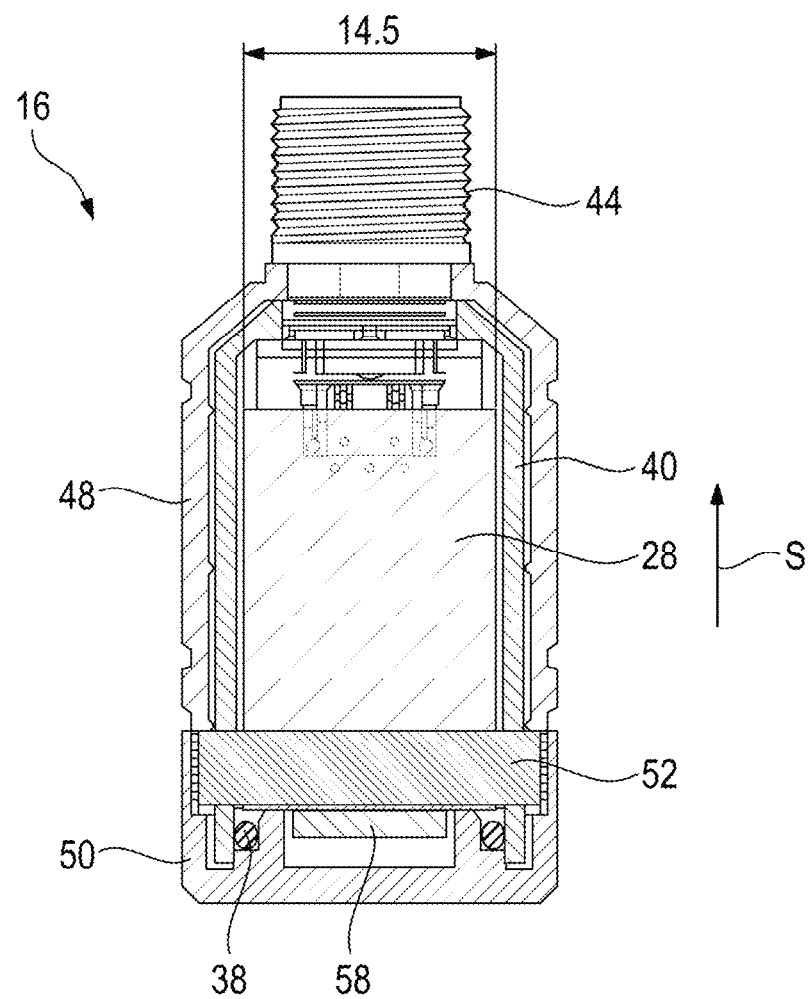
FIG. 4 is a side view of an exemplary embodiment of the storage device.
Figure 5:
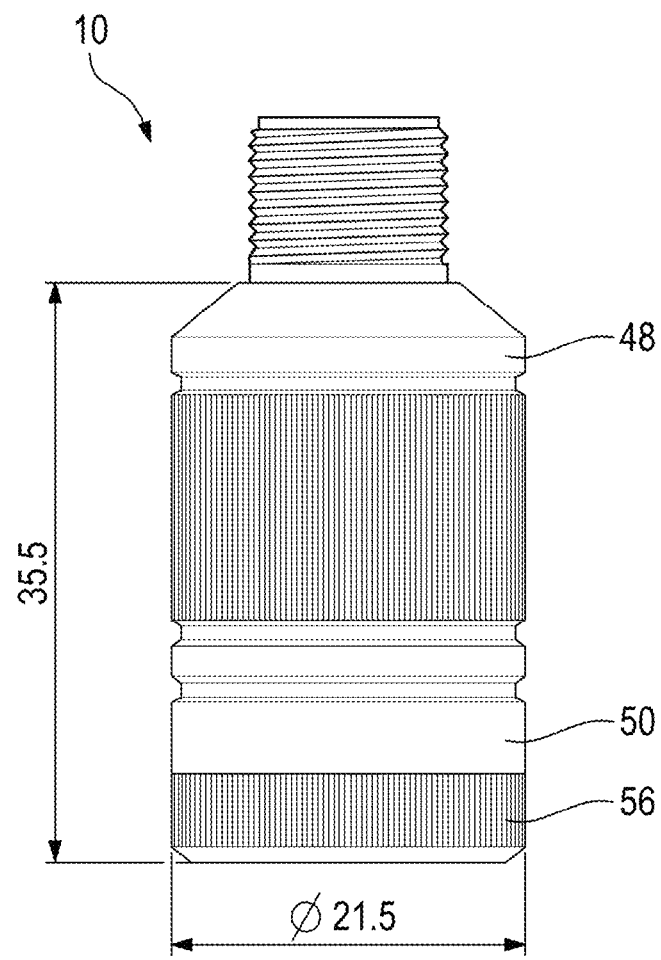
FIG. 5 is a cross-sectional view of the housing of the exemplary embodiment according to FIG. 4.

FIGS. 4 and 5 show an example of the storage device in a side view and in a cross-sectional view. Identical reference signs indicate identical parts as in FIGS. 1 to 3.

The housing 16 in this exemplary embodiment is also assembled from a first part 48 and a second part 50. The first part 48 is tubular and has a male thread 44, 52 at each end, and the first thread 44 is used to secure the housing 16 to a complementary mating connector in the manner described above. The cover-like second part 50 can be screwed onto the second thread 52, which has a corresponding counter thread 54. An O-ring 38 seals the inside of the housing 16 when the second part 50 is screwed onto the first part 48.

A knurl 56 on the outer surface of the second part 50 facilitates opening and closing of the housing 16, and another knurl on the outer surface of the first part 48 facilitates handling when attaching the storage device to the technical installation.

The first connector 12 and the second connector 14 are located inside the housing 16. The first connector 12 and the second connector 14 are coupled here via a printed circuit board 28. The PCB 28 can be a standard commercial PCB with one or more planes (layers) extending parallel to the mating direction S. In the depicted exemplary embodiment, the first connector 12 and the second connector 14 form a flat module, wherein the first connector 12 is a "wired" component and is attached to the printed circuit board 28 by through-hole mounting, and wherein the second connector 12 is soldered directly onto the printed circuit board 28 by surface mounting using solderable connection surfaces. The combination of both assembly techniques has the advantage of higher mechanical stability.

The receptacle arranged on the circuit board 28 (not shown here) can be a memory card reader into which a memory card 58 can be inserted. The memory card 58 can be a commercially available micro SD card suitable for industrial use. The memory card can also be an SD card that can be operated in a "high-speed SD mode", as five or more pins can be provided for connecting the card via a round plug connector, thus allowing additional data lines to be used. Micro SD cards are well suited because they are not much wider than the diameter of an M12 round connector and therefore the memory device can be very narrow.

The PCB 28 can also be arranged on a PCB holder 40, which can be inserted into the first part 48 with perfect fit. The PCB holder 40 is rotatably mounted in the first part 48, so that the first part 48 can be rotated around the fixed PCB holder 40. Otherwise, the PCB holder 40 lies at least partially flush with the inner surfaces of the first part 48 and the second part 50, so that the PCB holder 40 can be rotated but not shifted in the housing 16.

Figure 6:
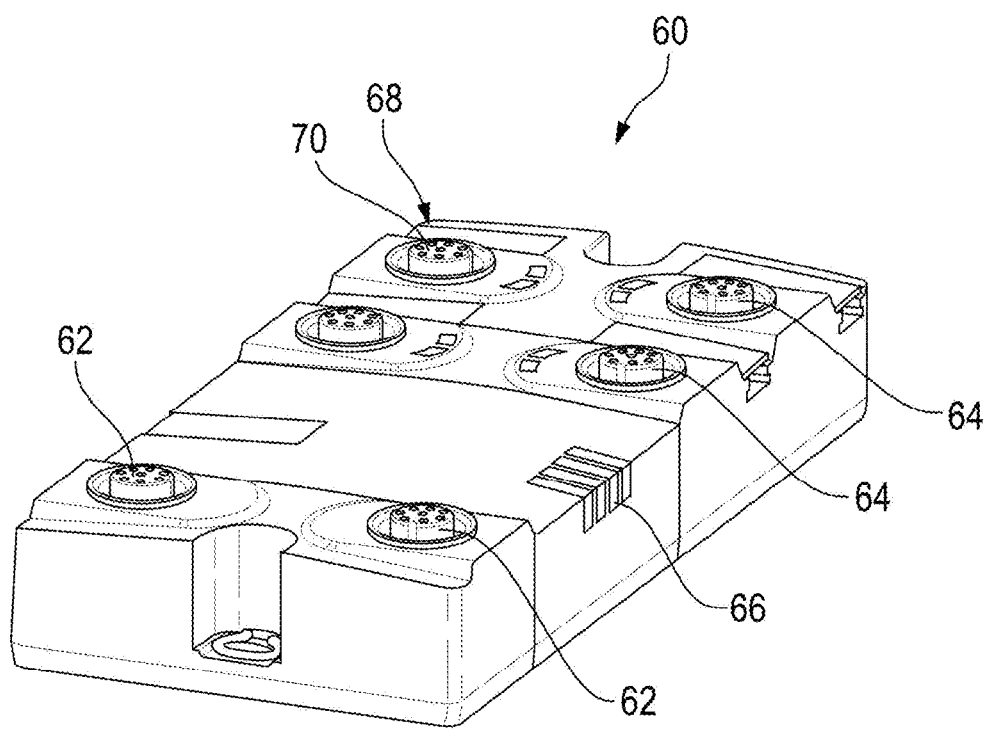
FIG. 6 is a schematic view of a technical installation for use with a storage device according to an embodiment of the present disclosure.

FIG. 6 shows an example of a technical installation at which a storage device according to this disclosure can be used.

The technical installation is here a peripheral unit 60, which is used to connect technical systems and their associated sensors and actuators to a control system.

The peripheral unit 60 can, for example, have communication interfaces 62 for connection to a communication medium and inputs and outputs 64 for coupling with sensors and actuators of the technical system. Process data can be exchanged via the communication interfaces 62, for example, via a fieldbus connection or other networking means. Alternatively, a peripheral unit can also be directly connected to a control unit.

The inputs can receive process data, process the process data and/or forward the process data from the technical system. Via the outputs 64 the actuators can be controlled based on the process data. Display means 66 can display the current status of the inputs and the outputs 64.

Peripheral units of this type are designed to be used in a decentralized manner in the field to reduce the installation and maintenance costs of a technical system and to create space in the control cabinet. The peripheral units must therefore regularly be housed in a hardened and dirt and water resistant IP67 housing to withstand the harsh environmental conditions in the field. The connections for the interfaces as well as inputs and outputs must also be adapted to the demanding environmental conditions.

Despite the different functions of the communication interfaces 62, the inputs, and the outputs 64, a uniform connection type is regularly used in order to keep the design complexity of the peripheral unit 60 as low as possible. Screwable round plug connectors have proven themselves in the field of automation technology, enabling simple, less error-prone and mostly tool-less assembly and at the same time guaranteeing a high degree of protection (IP67 or higher).

The configuration of such peripheral units 60 can be based on removable storage concepts to save costs. This means that the peripheral units are usually equipped with terminals that can accept removable storage media containing the configuration data used to configure the peripheral unit. Thanks to the removable storage concept, the peripheral units can be easily configured and, in addition, devices can be exchanged without any problems, as only the removable storage medium needs to be replugged.

This removable storage concept can be further simplified with a storage device according to the present disclosure. According to the present concept, there is no need for an integrated memory card reader, since a memory device according to the present disclosure only requires a corresponding connector. Such a connector can be implemented on the peripheral unit 60 by means of a further connector 68, which is designed in the same way as a connector for the communication interfaces 62 or the inputs and outputs 64. Thus, the same industry-proven connection technology can be used for the removable storage device that is used for the communication interface or the inputs and outputs. However, at the same time, a storage medium can be used that is not originally designed for such a connection technology.

Furthermore, the configuration of peripheral unit 60 can be done by simply inserting or replacing a memory card without having to change the memory card in the field. Handling and maintenance can thus be simplified by the new storage device.

The scope of protection of the present invention is determined by the following claims and is not limited by the features explained in the description or shown in the figures.

The phrase at least one of A, B, and C should be construed to mean a logical (A OR B OR C), using a non-exclusive logical OR, and should not be construed to mean "at least one of A, at least one of B, and at least one of C."

What is claimed is:

1. A storage device for mobile provision of data at a technical installation, comprising:
    a first connector for mechanical connection to a complementary mating connector,
    a second connector adjoining the first connector, and
    a housing enclosing the first connector and the second connector,
    wherein the second connector is configured to releasably receive a storage medium in a receptacle and to contact power and data connections of the storage medium when the storage medium is in the receptacle,
    wherein the first connector is configured to be coupled to the second connector and, as a result of the coupling, the power and data connections of the storage medium can be contacted via the first connector, and
    wherein the first connector is at least one of (i) a round plug connector with a connecting element having a circular cross-section and (ii) a heavy-duty connector.

2. The storage device of claim 1, wherein the housing comprises:
    a first section that surrounds the connecting element of the first connector in a sleeve-like manner, wherein the first section is cylindrical, and
    a thread via which the housing can be screwed onto the complementary mating connector for the mechanical connection of the first connector to the complementary mating connector.

3. The storage device of claim 2, wherein the thread of the housing is at least one of M12, M8, M23, and ⅞-inch.

4. The storage device of claim 1, wherein the connecting element has a standardized mating face.

5. The storage device of claim 4, wherein the standardized mating face is in compliance with at least one of IEC61076-2 and IEC60352-4.

6. The storage device of claim 1, wherein the housing comprises:
    a first section,
    a second section rigidly coupled to the first section and surrounding the second connector in a sleeve-like manner, and
    a third section detachably arranged on the second section and configured to seal the housing on one side.

7. The storage device of claim 6, wherein:
    the first section surrounds the connecting element of the first connector in a sleeve-like manner,
    the first section is cylindrical, and
    the housing comprises a thread via which the housing can be screwed onto the complementary mating connector for the mechanical connection of the first connector to the complementary mating connector.

8. The storage device of claim 6, wherein at least one of the second section and the third section has a knurling.

9. The storage device of claim 6, wherein the second section is screwed onto the third section.

10. The storage device of claim 9, wherein the housing is closed, dust-tight, and watertight when the first connector is screwed onto the complementary mating connector.

11. The storage device of claim 10, wherein the housing is in compliance with IP67 when the first connector is screwed onto the complementary mating connector.

12. The storage device of claim 1, wherein the first connector and the second connector are immovable relative to each other and are rotatably mounted as a unit inside the housing relative thereto.

13. The storage device of claim 1, wherein:
the second connector is arranged within the housing on a printed circuit board on which the power and data connections are led out as conductor tracks, and
the first connector is coupled to the second connector via the printed circuit board.

14. The storage device of claim 13, further comprising a circuit board holder rotatably mounted within the housing and configured to hold the printed circuit board in a defined position relative to the housing.

15. The storage device of claim 1, wherein the second connector is a memory card holder in which memory cards can be inserted as the storage medium.

16. The storage device of claim 15, wherein the memory cards are SD cards.

17. The storage device of claim 1, wherein:
the first connector is the round plug connector, and
the round plug connector comprises five pins.

18. The storage device of claim 17, wherein the round plug connector is an eight-pin connector.

19. The storage device of claim 1, wherein:
the first connector defines a plug-in direction S in which the first connector can be plugged onto the complementary mating connector, and
the housing extends in a tubular manner in a longitudinal direction parallel to the plug-in direction S.

20. The storage device of claim 19, wherein a cross-section of the housing has a diameter of less than or equal to 21.5 mm.

* * * * *